United States Patent [19]

Kruzick

[11] Patent Number: 5,542,807
[45] Date of Patent: Aug. 6, 1996

[54] VEHICLE MOUNTED, VARIABLE LENGTH HOOK HOIST

[75] Inventor: Kent Kruzick, Winamac, Ind.

[73] Assignee: Galbreath Incorporated, Winamac, Ind.

[21] Appl. No.: 237,459

[22] Filed: May 3, 1994

[51] Int. Cl.$^6$ ............................................. B60P 1/64
[52] U.S. Cl. ........................ 414/491; 414/498; 414/555
[58] Field of Search ............................ 414/475, 477–9, 414/480, 491, 494, 498, 555; 280/638, 656, 785

[56] References Cited

U.S. PATENT DOCUMENTS

| | | | |
|---|---|---|---|
| 3,430,792 | 3/1969 | Grove et al. | 414/477 |
| 3,485,400 | 12/1969 | Pewthers | 414/477 |
| 3,825,137 | 7/1974 | Mackrill et al. | 414/498 |
| 4,290,726 | 9/1981 | Sutela et al. | 414/498 X |
| 4,344,731 | 8/1982 | Visa et al. | 414/491 X |
| 4,453,878 | 6/1984 | Paukku | 414/498 X |
| 4,755,098 | 7/1988 | Wulf et al. | 414/491 X |
| 5,088,875 | 2/1992 | Galbreath et al. | 414/480 X |
| 5,108,247 | 4/1992 | Vlaanderen | 414/421 |
| 5,183,371 | 2/1993 | O'Daniel | 414/477 |
| 5,213,466 | 5/1993 | Bubik | 414/498 X |

FOREIGN PATENT DOCUMENTS

| | | | |
|---|---|---|---|
| 123-723-A | 10/1983 | European Pat. Off. . | |
| 2641743 | 7/1990 | France | 414/477 |
| 3151571A1 | 7/1983 | Germany . | |

Primary Examiner—James W. Keenan
Attorney, Agent, or Firm—Woodard, Emhardt, Naughton Moriarty & McNett

[57] ABSTRACT

A truck and hook hoist combination for picking up and manipulating a container having a grasping ring includes a vehicle having a frame with a rear; a hook hoist including a hoist frame with a rear, a roller frame having a rear and being connected to and at the rear of the hoist frame, and a jib assembly having inboard and outboard ends and being pivotally connected about an axis to the hoist frame, the roller frame including at least one roller rotatably mounted to the rear of the frame and being configured for variable slidable longitudinal extension relative to the rear of the hoist frame prior to the roller frame being rigidly connected to the hoist frame, and wherein the jib assembly includes a hook at its outboard end, the hook defining a base with a front and a rear, a post extending up from the front of the base and a main arcuate hook body extending up from the rear of the base, wherein the base, post and hook body together define a saddle sized to engage with and receive a container grasping ring therein and to transmit both forward and rearward movement of the hook to a container substantially entirely through the contact in the saddle between the hook and the grasping ring; hydraulic cylinders for pivoting the jib assembly about its axis; and, at least two hoist connecting bracket assemblies each including a lower bracket fixed to the vehicle frame and a mating upper bracket fixed to the hoist frame, and wherein the mating upper and lower brackets are connected together and each upper bracket includes a container seat configured to support a portion of a container thereon.

16 Claims, 4 Drawing Sheets

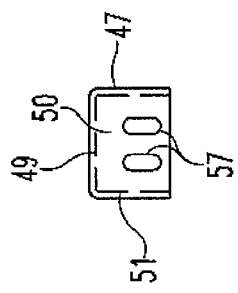
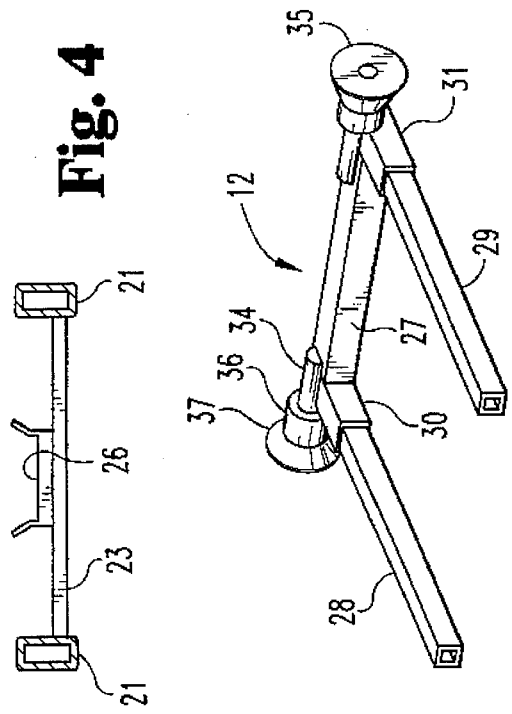
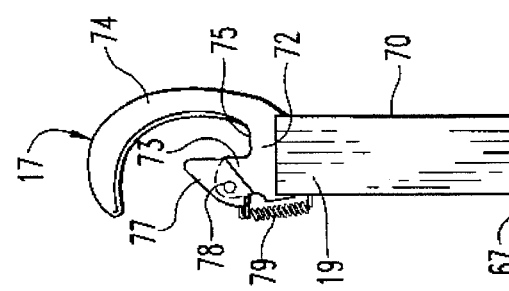
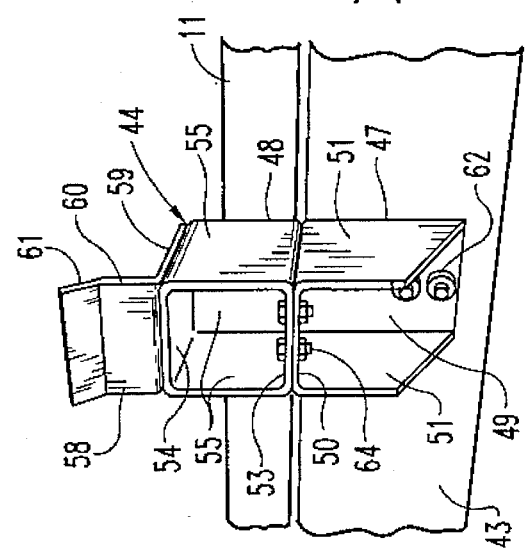
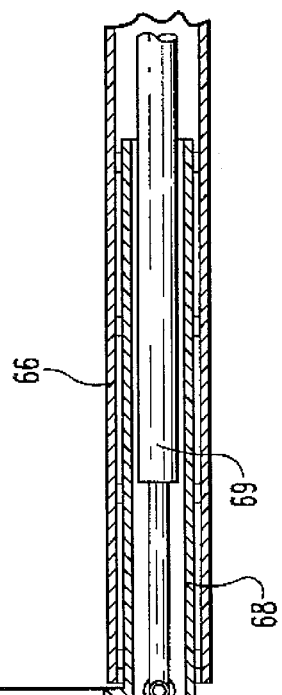

VEHICLE MOUNTED, VARIABLE LENGTH HOOK HOIST

FIELD OF THE INVENTION

The present invention relates to the field of waste container transport, and more specifically to vehicle mounted, variable length hook hoists.

BACKGROUND OF THE INVENTION

In the container transport industry, one known device for loading a box or container onto a vehicle is a hook-hoist. This essentially consists of an L-shaped arm having a container-engaging hook at one end and being pivotally connected to the vehicle at its other end. Rollers are mounted at the rear of the vehicle. To load a container, the arm is pivoted rearwardly and maneuvered until the hook engages with the container. As the arm is pivoted forwardly, the container is lifted, front end first, and pulled forward until it contacts the rollers, at which point the container both rolls forwardly along and pivots about the rollers. Ultimately, the arm returns to its rest position and the container sits atop the container supports which, at the rear of the vehicle, consists of the rollers. The arm also is telescopically extendable at this stage whereby the container may then be pulled forward to a more desirable transport position.

Containers are made in different sizes, for example, 10, 12, 14, 16 or 18 feet long. While a hauler may wish to haul all sizes of containers on one truck, federal safety laws prohibit an overhanging load from extending more than 24 inches beyond the rear bumper. A given hook hoist vehicle can therefore only accommodate a specific range of containers. For example, one vehicle might be able to carry nothing shorter than a 12 foot box and, legally, nothing longer than a 14 foot box. Further, because of the manner in which a hook hoist dumps the container load (by pivoting the arm and the container rearwardly until the tail end of the container touches ground), the latter vehicle could achieve a fairly steep dump angle with a 12 foot container (facilitating dumping). But because the tail end of a 14 foot container extends rearwardly farther, it would touch ground sooner upon its being pivoted and pushed rearwardly, and a lesser dump angle would result. Dumping the 14 foot box's contents is therefore less efficient. In further contrast, only a very limited dump angle could be achieved with a 16 foot box on this size truck, and effective dumping would be practically impossible. Furthermore, the rear end of a 16 foot box (or anything longer than a 14 foot box) would extend farther past this vehicle's rear bumper than allowed by federal law. Consequently, each size of container is best fitted with a certain length truck having constructed thereon a correspondingly dimensioned hook hoist. This requires construction of a differently sized hook hoist for each different vehicle length.

What is needed is a truck and/or hook hoist design that can facilitate the construction of the vehicle mounted hook hoist.

SUMMARY OF THE INVENTION

Generally speaking, there is provided a vehicle mounted, variable length, hook-hoist, which facilitates mounting of the hook hoist onto a vehicle for a wide variety of container lengths.

A truck and hook hoist combination for picking up and manipulating a container having a grasping ring includes a vehicle having a frame with a rear; a hook hoist including a hoist frame with a rear, a roller frame having a rear and being connected to and at the rear of the hoist frame, and a jib assembly having inboard and outboard ends and being pivotally connected about an axis to the hoist frame, the roller frame including at least one roller rotatably mounted to the rear of the frame and being configured for variable slidable longitudinal extension relative to the rear of the hoist frame prior to the roller frame being rigidly connected to the hoist frame, and wherein the jib assembly includes a hook at its outboard end, the hook defining a base with a front and a rear, a post extending up from the front of the base and a main arcuate hook body extending up from the rear of the base, wherein the base, post and hook body together define a saddle sized to engage with and receive a container grasping ring therein and to transmit both forward and rearward movement of the hook to a container substantially entirely through contact in the saddle between the hook and the grasping ring; hyrdraulic cylinders for pivoting the jib assembly about its axis; and, at least two hoist connecting bracket assemblies each including a lower bracket fixed to the vehicle frame and a mating upper bracket fixed to the hoist frame, and wherein the mating upper and lower brackets are connected together and each upper bracket includes a container seat configured to support a portion of a container thereon.

It is an object of the present invention to provide an improved vehicle mounted hook hoist.

Further objects and advantages of the present invention will become apparent from the following description of the preferred embodiment.

BRIEF DESCRIPTION OF THE DRAWINGS

FIG. 4 is a cross-sectional view of the hoist 10 of FIG. 3 taken along the lines 4—4 and viewed in the direction of the arrows.

FIG. 5 is a perspective view of the roller frame 12 of FIG. 3.

FIG. 6 is a perspective view of the hoist connector bracket assemblies 44 of hoist frame 10 of FIG. 1.

FIG. 7 is a plan view of the lower hoist frame bracket 47 of the hoist connector bracket assembly 44 of FIG. 6.

FIG. 8 is a fragmented, side, partially cross-sectional view of jib assembly 13 of hoist 10 of FIG. 1.

DESCRIPTION OF THE PREFERRED EMBODIMENT

Figure 1:
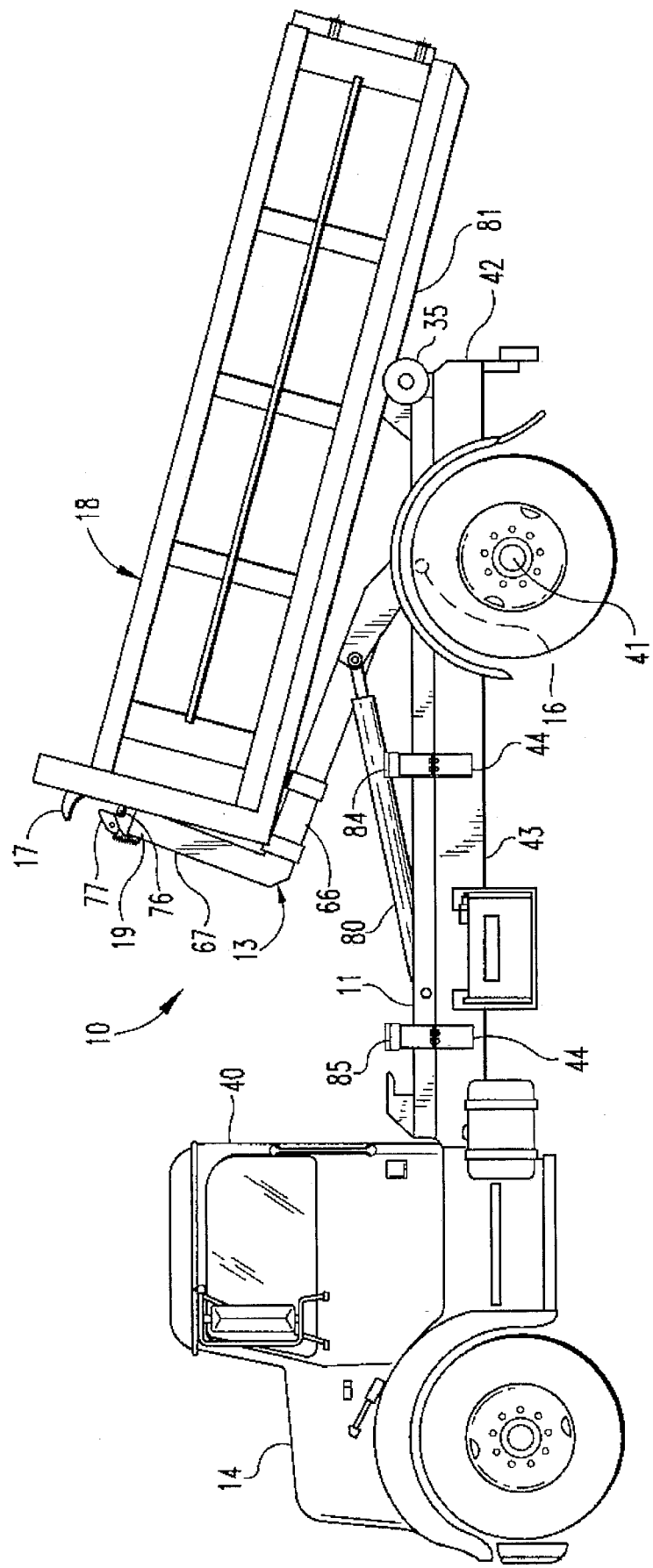
FIG. 1 is a side elevational view of a vehicle-mounted, variable length hook hoist 10 for picking up, transporting and dumping containers in accordance with the preferred embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended.

Figure 2:
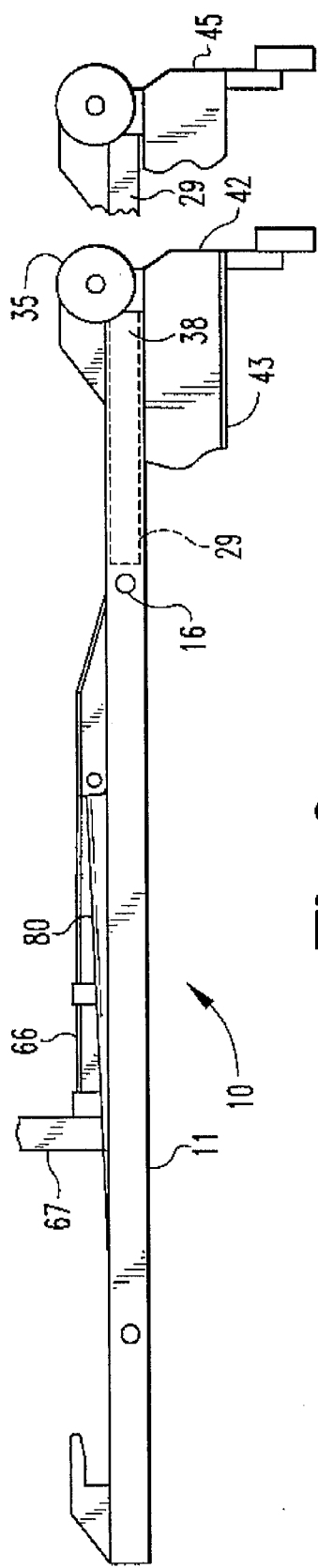
FIG. 2 is a partially fragmented, side elevational view of the hoist 10 of FIG. 1 along with a fragmented view of the hoist 10 extended to fit a vehicle with a longer rear cut off 43.
Figure 3:
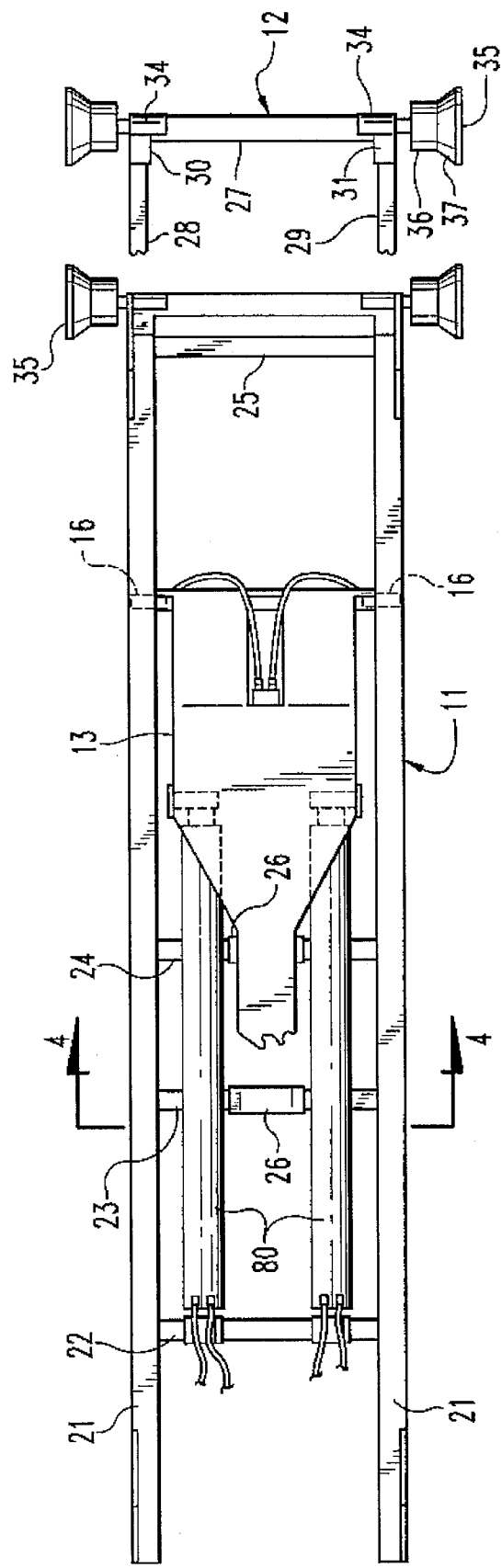
FIG. 3 is a partially fragmented, plan view of the hoist 10 of FIG. 2.

Referring now to FIGS. 1–3, there is shown a vehicle-mounted, variable length hook hoist 10 for picking up, transporting and dumping containers in accordance with the preferred embodiment of the present invention. Hoist 10 is a variably dimensioned unit which is adapted to be fitted to trucks of varying lengths, thereby enabling pick up, transport and dumping of a greater range of containers with a single hoist. Hoist 10 is rigidly mounted to a truck 14 and generally includes a hoist frame 11, a roller frame 12 connected to the rear of hoist frame 11, and an L-shaped arm or jib assembly 13 pivotally mounted to hoist frame 11 at pivot pins 16. At the outboard end 19 of jib assembly 13 is a container pickup hook 17. As is generally known, a hook hoist such as the one described here is operable to pivot its jib assembly 13 about pins 16 to the rear (clockwise as shown in FIG. 1) and to engage the jib assembly's hook 17 with a container 18. Jib assembly 13 is then pivoted forwardly (counterclockwise as shown in FIG. 1), the container thereby being lifted in an arcing movement up onto the vehicle. Once the jib assembly has been rotated completely back to its forward, rest position, and the container is resting horizontally atop the vehicle, the jib (67) of the jib assembly is extended forwardly, thereby pulling the container forward to a more desirable transport position.

Hoist frame 11 includes a pair of parallel, elongate box channel frame members 21, which are secured together by cross members 22, 23, 24 and 25. A jib rest 26 is provided on top of each of cross members 23 and 24. Each jib rest 26 is located substantially midway between frame members 21. (FIGS. 3 and 4)

Referring to FIGS. 1–3 and 5, roller frame 12 is generally U-shaped and includes a pair of elongate box channel beams 28 and 29, each connected to a somewhat larger dimensioned, short segment of box channel 30 and 31. Segments 30 and 31 are rigidly connected together by a laterally extending frame member 27. Roller frame 12 further includes a pair of roller mounting axles 34 which are seated within complementary shaped recesses (not shown) defined in opposing ends of frame member 27 and in segments 30 and 31. This provides for additional stability in the connection between axles 34 and frame member 27 and segments 30 and 31. Alternative construction could be used to connect axles 34 to the rest of roller frame 12. A pair of rollers 35 are held for free rotation by and to the outside of roller mounting axles 34. Each roller 35 includes a cylindrical roller surface 36 and a frustoconical roller surface 37 which is juxtaposed outside of its adjacent cylindrical surface 36. Segments 30 and 31 have substantially the same dimensions (except for axial length) as frame members 21. The outer dimensions of beams 28 and 29 are just slightly less than the inner dimensions of the hollow frame members 21, and roller frame 12 is sized so that beams 28 and 29 may be telescopically received within the rear ends 38 of frame members 21. In this manner, a single hoist frame 11 may be adapted to fit a variety of different truck lengths. For example, in one embodiment shown in FIGS. 1–3, the cab to axle (CA) distance (from the rear of cab 40 to the rear axle 41) is 120". The truck frame extends rearwardly from axle 41 another 36" to its cutoff at 42. With beams 28 and 29 of roller frame 12 inserted completely into the rear ends 38 of frame members 21, the overall minimum length of this hoist frame 11 is approximately a corresponding 156". This vehicle-mounted hoist frame can therefore handle containers ranging from 156" to 180". (Federal law dictates that the maximum a load may extend rearwardly of the vehicle bumper is 24".) An operator may wish to extend the CA and/or rear extension of the truck frame to transport larger containers. If the CA is extended by 24", the truck frame cutoff (45) moves rearwardly a corresponding 24", and a different, larger hoist frame measuring 24" longer, or 180", would be needed. Instead, the hoist frame 11 of the present invention is adapted for such a longer vehicle by telescopically extending roller frame 12 rearwardly 24". Hoist frame 11 and its extended roller frame 12 are rigidly connected atop the longer truck frame (as will be described herein) in the same manner as with the shorter truck frame. Such a longer vehicle-mounted hoist may now handle containers ranging from 180" to 204". It should be noted that the sizes recited in the above described examples are provided for purposes of description only and are not intended to limit the scope of the present invention. Referring now to FIGS. 1, 6 and 7, hook hoist 10 is connected to and atop truck frame 43 primarily by hoist connector bracket assemblies 44. In the present embodiment, there are four bracket assemblies 44, two on each side of the vehicle and spaced front to back as shown in FIG. 1. Each bracket assembly 44 includes a lower hoist frame bracket 47 and an upper hoist frame bracket 48. Lower bracket 47 defines a truck frame engaging side 49, an upper bracket engaging side 50, and a pair of opposing interconnecting support sides 51. Truck frame engaging side 49 is provided with a number of apertures permitting it to be bolted to truck frame 43. Upper bracket 48 includes a lower bracket engaging side 53, an upper seat support side 54 and interconnecting support sides 55. Upper bracket 48 generally aligns atop lower bracket 47, and alignment between upper and lower brackets 48 and 47 is generally defined by a pair of slots 57 (FIG. 7). A container seat 58 is rigidly connected to the top of (or is an integral part of) upper bracket 48. Container seat 58 is generally an L-shaped plate with a generally flat section 59 positioned atop upper seat support side 54, and an outer container guide portion 60. Guide portion 60 angles outward slightly at its top at 61 to allow for minor misalignments during the maneuvering of a container 18 onto the truck.

Figure 9:
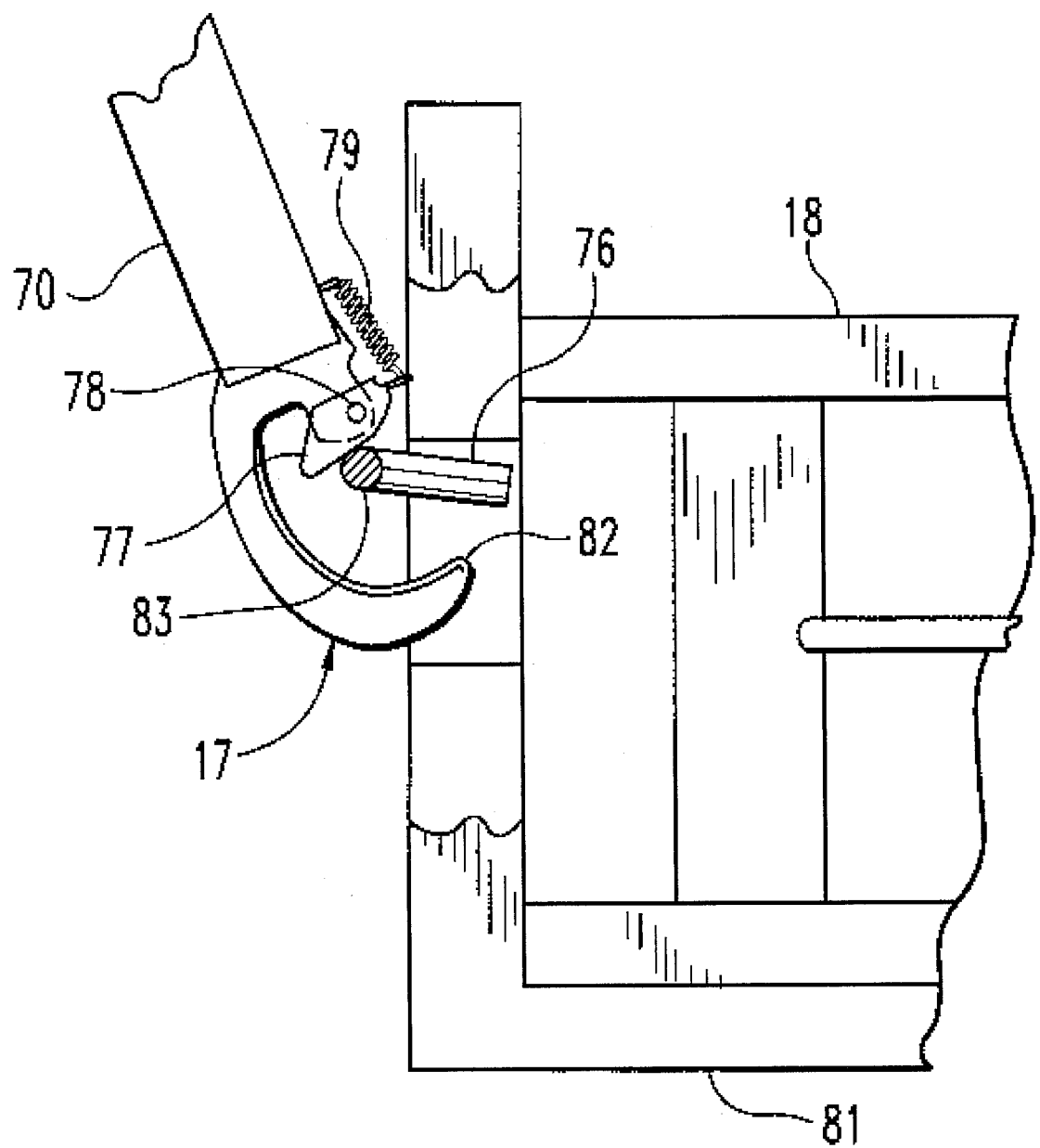
FIG. 9 is a partially fragmented, side, elevational view of the hook 17 of jib assembly 13 engaging with a container 18.

In assembly, a truck 14 of a given length is provided along with the hook hoist 10 of the present invention. Lower hoist frame brackets 47 are connected to truck frame 43 with bolts 62 so that upper bracket engaging side 50 is substantially level with or just above the top of truck frame 43. Alternate methods of fixing brackets 47 to truck frame 43 are contemplated by the present invention. Hoist frame 11 is then positioned as desired on top of truck frame 43. This includes extending roller frame 12 rearwardly as necessary so that segments 30 and 31 align at the rear of truck frame (e.g. at 42 oor 45), as described above and shown in FIGS. 1, 2 and 3. It should be noted that the configuration of various trucks may differ and the alignment of roller frame 12 with truck frame 43 will be determined according to the particular configuration at hand. Upper hoist frame brackets 48 are positioned atop lower brackets 47 so that the slots 57 in upper side 50 and corresponding lower side 53 of each bracket assembly 44 are in alignment. Upper brackets 48 are then rigidly connected to hoist frame 11 in an appropriate manner, such as welding. Bolts 64, extending through slots 57, are tightened to connect upper and lower brackets 47 and 48 tightly together. At the rear, roller frame 12 is rigidly connected both to hoist frame 11 and to truck frame 43 by appropriate means, such as welding. Hook hoist 10 is thereby rigidly connected to truck frame 43, and hoist connecter bracket assemblies 44 are also in the proper alignment, along with rollers 35, to receive and support a container 18 thereon. Referring now to FIGS. 1, 8 and 9, jib assembly 13 includes a jib sleeve 66 and an L-shaped jib 67. One leg 68 of jib 67 is telescopically received within jib sleeve 66. A double-acting hydraulic cylinder assembly 69 is connected between jib 67 and sleeve 66 (connection not shown) and is operable to cause the telescopic extension and retraction of jib 67. The other leg 70 of jib 67 extends upwardly and orthogonally from leg 68, and hook 17 is rigidly connected to the upper, outboard end 19 of leg 70. Hook 17 extends from its base 72 upwardly a short distance at its front to define a post 73. At its rear, hook 17 extends up and around in arcuate fashion to define the main hook body 74. Post 73 and arcuate body 74 combine together with base 72 to form a saddle 75 within which is received the grasping ring 76 of container 18. A dog 77 is pivotally connected to post 73 at pivot pin 78 and is biased to pivot about pin 78 in the counterclockwise direction, as shown in FIG. 8, by a spring 79 which extends in tension between dog 77 and the base of hook 17. A pair of double-acting cylinder assemblies 80 are connected between front cross member 22 and jib assembly 13. Extension and retraction of cylinder assemblies 80 causes the rearward and forward pivoting of jib assembly 13, respectively, about pivot pin 16.

The operation of the above-described vehicle-mounted hook hoist 10 is as follows:

A container 18 rests on its skids 81 on the ground or similar surface. Jib assembly 13 is rotated about pivot pins 16 rearwardly and truck 14 is maneuvered with respect to container 18 until hook 17 engages with grasping ring 76 of container 18, as shown in FIG. 9. Because the grasping ring 76 of the majority of containers 18 are either 33" or 36¼ from the ground (other dimensions may exist), different hook dimensions 17 are usually required. The hook design of the present invention with dog 77 enables hook 17 to be easily maneuvered to and engaged with grasping ring 76 of either of the above two mentioned containers. That is, dog 77 can pivot about its pin 78, thereby allowing hook 17 to be maneuvered rearwardly enough so that the toe 82 of hook 17 passes under and behind the front 83 of ring 76. Jib assembly or arm 13 may then be pivoted up and forwardly, thereby causing hook 17 to rise and engage with ring 76. For containers where ring 76 is roughly 3" lower, dog 76 will generally not be engaged, but toe 82 will still be low enough to pass under the front 83 and engage with ring 76. As arm 13 is pivoted forwardly, ring 76 falls against and follows the main hook body 74 and dog 77 is disengaged, allowing it to pivot back to its rest position due to spring 79. As arm 13 is pivoted forwardly, container 18 is lifted in an arcing fashion up and over the rear of truck 14 until skids 81 engage with rollers 35. Further forward pivoting of arm 13 causes ring 76 to fall into saddle 75 and pulls container 18 up onto truck 14 as container 18 both pivots and rolls along rollers 35, as shown in FIG. 1. Upon complete retraction of cylinder assemblies 80, jib assembly 13 is in the horizontal rest position (FIG. 2) and container 18 rests in a horizontal position atop rollers 35 and the rear pair 84 (one shown) of container seats 58. Extension of cylinder assembly 69 causes jib 67 to move forwardly and pull container along rollers 35 and the rear pair 84 of seats 58 until container is pulled all the way forward and now rests atop both the forward pair 85 and rear pair 84 of seats 58 and on rollers 35. Retraction of cylinder assembly 69 pulls jib 67 rearward for dumping or unloading. Because ring 76 is seated within saddle 75, the rearwardly directed force is applied to container 18 through hook 17 to ring 76 at saddle 75, instead of through the back side of jib 67 against the front side panel of container 18 as is customary with existing hoists. This redistribution of forces averts the damage normally caused to the container body. Because of the inner extension surface 86 of dog 77, containers with the higher grasping ring 76 will still be engaged by hook 17. That is, the ring 76 would engage the extension surface 86 of dog 77 (FIG. 8). Containers having the lower, 33 inch or similar height grasping ring will engage the backside 87 of post 73. Thus, hook body 74, post 73 and dog 77 effectively create a taller saddle 75 which will accommodate containers with varying heights of grasping rings. But, the pivoting of dog 77 about pin 78 will facilitate engagement of the grasping ring during container pick up.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A truck and hook hoist combination for picking up and manipulating a container having a grasping ring, comprising:

a vehicle having a frame with a rear, a hook hoist having an overall length and including a hoist frame with a rear, a roller frame having a rear and being rigidly connected to and at the rear of said hoist frame, and a jib assembly having inboard and outboard ends and being pivotally connected about an axis to said hoist frame, said roller frame including at least one roller rotatably mounted to the rear of said roller frame and wherein said roller frame is configured for variable slidable longitudinal extension relative to the rear of said hoist frame prior to said roller frame being rigidly connected to said hoist frame to enable variation of the overall length of said hook hoist assembled from one hoist frame and one roller frame, and wherein said jib assembly includes a hook at its outboard end, said hook defining a base with a front and a rear, a post extending up from the front of said base and a main arcuate hook body extending up from the rear of said base, wherein the base, post and hook body together define a saddle sized to engage with and receive a container grasping ring therein and to transmit both forward and rearward movement of said hook to a container substantially entirely through contact in the saddle between said hook and the grasping ring;

first power means for pivoting said jib assembly about its axis; and, at least two hoist connecting bracket assemblies each including a lower bracket fixed to said vehicle frame and a mating upper bracket fixed to said hoist frame, and wherein said mating upper and lower brackets are connected together and each upper bracket includes a container seat configured to support a portion of a container thereon.

2. The truck and hoist combination of claim 1 wherein the post defines an inner, substantially vertical, ring engaging surface when said jib assembly is pivoted completely forwardly, and wherein said hook includes a dog pivotally mounted to the post, the dog having an inner extension surface, a rest position and a pivoted position, the pivoted position including said dog being pivoted inwardly toward the hook body, and the rest position including the dog extending upwardly of the post with the extension surface substantially coplanar with the ring engaging surface.

3. The truck and hoist combination of claim 2 wherein said hook further includes a spring mounted between the dog and the hook, biasing the dog to the rest position.

4. The truck and hoist combination of claim 1 wherein said jib assembly includes a jib sleeve pivotally mounted to said hoist frame and an L-shaped jib mounted to the sleeve for telescopic extension and retraction, the jib defining the outboard end and the sleeve defining the inboard end.

5. The truck and hoist combination of claim 1 wherein said hoist frame includes a pair of box channel frame members, and said roller frame includes a pair of beams sized and configured to be telescopically received within the frame members at the rear of said hoist frame.

6. The truck and hoist combination of claim 5 wherein said at least one roller includes a pair of rollers mounted for free, coaxial rotation on opposing sides of said roller frame.

7. The track and hoist combination of claim 6 wherein each of said rollers includes a cylindrical roller surface and a frustoconical roller surface adjacent and outside of the cylindrical roller surface.

8. The truck and hoist combination of claim 5 wherein said hoist frame and said roller frame define an overall length, wherein said hoist frame and said roller frame are sized and configured so that the overall length can be up to 24 inches longer when said roller frame is telescopically extended and fixed to said hoist frame than when said roller frame is completely telescopically retracted and fixed to said hoist frame.

9. A truck and hook hoist combination for picking up and manipulating a container having a grasping ring, comprising:

a vehicle having a frame with a rear;

a hook hoist including a hoist frame with a rear, a roller frame fixed to the rear of the hoist frame and a jib assembly, and wherein the roller frame is sized and configured to variably telescopically engage with the rear of the hoist frame prior to being fixed to the hoist frame, and wherein the jib assembly has an inboard end and an outboard end, is pivotally connected about an axis to the hoist frame at its inboard end and has a hook at its outboard end, the hook being sized and shaped to engage with a container grasping ring, at least one roller mounted for rotation to the roller frame at the rear of the vehicle frame, said at least one roller sized and positioned relative to said hoist frame to rollingly support a container thereatop that is being manipulated by said jib assembly; and, first power means for pivoting said jib assembly about its axis.

10. The truck and hook hoist combination of claim 9 wherein the rear of the hoist frame comprises at least one hollow frame member with an inner dimension and the roller frame comprises at least one beam that is sized and configured to extend within the hollow frame member.

11. The truck and hook hoist combination of claim 10 wherein the rear of the hoist frame comprises two of the at least one hollow frame members and the roller frame comprises two of the at least one beams, each beam being sized and configured to extend within a corresponding one of the hollow frame members.

12. The truck and hook hoist combination of claim 11 wherein said jib assembly includes a jib sleeve pivotally mounted to said hoist frame and an L-shaped jib mounted to the sleeve for telescopic extension and retraction, the jib defining the outboard end and the sleeve defining the inboard end.

13. The truck and hook hoist combination of claim 9 wherein said at least one roller includes a pair of rollers mounted for free, coaxial rotation on opposing sides of said roller frame.

14. The truck and hook hoist combination of claim 13 wherein said two of said rollers are mounted for rotation about a common axis.

15. The truck and hook hoist combination of claim 13 wherein each of said rollers includes a cylindrical roller surface and a frustoconical roller surface adjacent and outside of the cylindrical roller surface.

16. The truck and hook hoist combination of claim 9 wherein said hoist frame and said roller frame define an overall length, wherein said hoist frame and said roller frame are sized and configured so that the overall length can be up to 24 inches longer when said roller frame is telescopically extended and fixed to said hoist frame than when said roller frame is completely telescopically retracted and fixed to said hoist frame.

* * * * *

UNITED STATES PATENT AND TRADEMARK OFFICE
CERTIFICATE OF CORRECTION

PATENT NO. : 5,542,807

DATED : August 6, 1996

INVENTOR(S) : Kent Kruzick

It is certified that error appears in the above-identified patent and that said Letters Patent is hereby corrected as shown below:

In column 4, line 17, "Referring" should begin a new paragraph.

In column 4, line 51, please change "oor" to --or--.

In column 5, line 31, please add --"-- after "36¼".

In column 7, line 14, please change "track" to --truck--.

Signed and Sealed this

Twenty-fourth Day of December, 1996

Attest:

BRUCE LEHMAN

Attesting Officer

Commissioner of Patents and Trademarks